United States Patent
Oh

(10) Patent No.: US 7,548,287 B2
(45) Date of Patent: Jun. 16, 2009

(54) BACKLIGHT ASSEMBLY COMPRISING GUIDE GROOVES AND ADHESIVE TAPES FORMED THEREIN FOR ATTACHING FLEXIBLE PRINTED CIRCUIT TO LIGHT GUIDE PLATE

(75) Inventor: Ji Soon Oh, Gumi-si (KR)

(73) Assignee: LG. Display Co., Ltd., Seoul (KR)

( * ) Notice: Subject to any disclaimer, the term of this patent is extended or adjusted under 35 U.S.C. 154(b) by 203 days.

(21) Appl. No.: 11/635,352

(22) Filed: Dec. 7, 2006

(65) Prior Publication Data
US 2008/0002099 A1 Jan. 3, 2008

(30) Foreign Application Priority Data
Jun. 30, 2006 (KR) .................. 10-2006-0060071

(51) Int. Cl.
*G02F 1/1335* (2006.01)
(52) U.S. Cl. .................. 349/65; 349/150; 362/612; 362/615; 362/631
(58) Field of Classification Search ............. 349/61–71, 349/58, 150; 362/600–634; 385/146, 901
See application file for complete search history.

(56) References Cited

U.S. PATENT DOCUMENTS

| | | | |
|---|---|---|---|
| 6,612,710 B2 * | 9/2003 | Suzuki et al. | 362/600 |
| 7,083,317 B2 * | 8/2006 | Higashiyama | 362/612 |
| 7,359,012 B2 * | 4/2008 | Ishiwa et al. | 349/65 |
| 2005/0276068 A1 * | 12/2005 | Chen et al. | 362/600 |

* cited by examiner

*Primary Examiner*—Thoi V Duong
(74) *Attorney, Agent, or Firm*—Brinks Hofer Gilson & Lione

(57) ABSTRACT

An backlight assembly is provided. The backlight assembly includes a substrate, a light guide plate, a plurality of adhesive tapes, and guide grooves. The substrate includes conductive patterns supplying power to a light source device, and the light guide plate is disposed to form the same plane as that of the light source device. The plurality of adhesive tapes are attached at predetermined intervals in a region where the substrate and the light guide plate overlap each other. The guide grooves are formed in a region where the adhesive tapes are attached.

19 Claims, 9 Drawing Sheets

BACKLIGHT ASSEMBLY COMPRISING GUIDE GROOVES AND ADHESIVE TAPES FORMED THEREIN FOR ATTACHING FLEXIBLE PRINTED CIRCUIT TO LIGHT GUIDE PLATE

PRIORITY CLAIM

Priority is claimed to Korean Patent Application No. 2006-60071 filed Jun. 30, 2006, the disclosure of which is incorporated by reference herein.

TECHNICAL FIELD

The present invention relates to a backlight assembly, and more particularly, to a backlight assembly with uniform brightness, and a liquid crystal display device having the same.

DESCRIPTION OF THE RELATED ART

In general, a cathode ray tube (CRT), one of widely used display devices, is being used mainly for a monitor of a TV, an measuring instrument, an information terminal, or the like. However, the CRT cannot actively cope with a tendency toward miniaturization and lightweight of an electronic product because of the CRT's own weight and size.

As a solution of the problem, a liquid crystal display device (LCD) may be used, which is advantageous in realizing a slim and lightweight device and low power consumption thereof. Particularly, since the LCD using a thin film transistor achieves high quality, a large size and color expressions of a display screen, the LCD is being used in various fields including a notebook PC, a monitor and a small-sized display device such as a cellular phone.

The LCD includes a backlight assembly providing light to an LCD panel that displays an image.

FIG. 1 is an exploded perspective view illustrating a related art small-sized LCD, FIG. 2 is a partial cross-sectional view of the small-sized LCD taken along line I-I' of FIG. 1, and FIG. 3 is a cross-sectional view of the small-sized LCD taken along line II-II' of FIG. 1.

Referring to FIGS. 1 and 3, the related art small-sized LCD includes an LCD panel 10, a backlight assembly 30 providing light to the LCD panel 10, and a light blocking tape 20 fixing the backlight assembly 30 with the LCD panel 10.

The backlight assembly 30 includes a reflector 70, a light guide plate 60, optical sheets 40 which are seated on a bottom cover 80, a plurality of light emitting diodes 50, and a flexible printed circuit (FPC) 51. Here, the reflector 70, the light guide plate 60 and the optical sheets 40 are sequentially mounted on the bottom cover 80, and the plurality of light emitting diodes 50 are disposed on one side of the bottom cover 80 to form the same plane as that of the light guide plate 60. The FPC 51 includes a conductive pattern to supply power to the light emitting diodes 50.

The backlight assembly 30 further includes a plurality of adhesive tapes 90. The plurality of adhesive tapes 90 are attached on one side of an upper surface of the light guide plate 60 at predetermined intervals in order to fix one side of a lower surface of the FPC 51 with the one side of the upper surface of the light guide plate 60.

The backlight assembly 30 is assembled such that the reflector 70, the light guide plate 60 and the optical sheets 40 are placed on the bottom cover 80, and the FPC 51 provided with the light emitting diodes 50 is placed on one side of the bottom cover 80. Here, one side of the upper surface of the light guide plate 60 overlaps one side of the lower surface of the FPC 51. The overlapping sides of the light guide plate 60 and the FPC 51 are fixed by the adhesive tapes 90, each of which is a double-sided adhesive tape.

The adhesive tape 90 is attached on a portion of the light guide plate 60 that does not correspond to a region where the light emitting diodes 50 are formed. The adhesive tapes 90 are disposed without corresponding to the region where the light emitting diodes 50 are formed, so that the adhesive tapes 90 are prevented from causing diffuse reflection of light emitted from the light emitting diodes 50 and thus from making brightness nonuniform around the region where the light emitting diodes 50 are placed.

A light blocking tape 20 is attached along an edge of the optical sheets 40 and an upper surface of the FPC 51, thereby completing the assembling of the backlight assembly 30.

The LCD panel 10 is attached on the light blocking tape 20, thereby completing assembling of the LCD.

However, the related art LCD is disadvantageous in that because of the thickness of the adhesive tape 90, clearances C occur between the plurality of adhesive tapes 90 that fix the FPC 51 and the light guide plate 60 together. As light of the light emitting diodes 50 is emitted to the clearances C, light that does not pass through the light guide plate 60 (light leakage) undesirably creates hot-spots where dark and bright portions are repeated around the region in which the light emitting diodes 50 are disposed.

SUMMARY

Accordingly, the present invention is directed to a backlight assembly and an LCD having the same that substantially obviate one or more problems due to limitations and disadvantages of the related art.

In accordance with the purpose of the invention, as embodied and broadly described herein, there is provided a backlight assembly including a substrate having a conductive pattern supplying power to a light source device. A light guide plate is disposed in the same plane as the light source device. A plurality of adhesive tapes are located at predetermined intervals in a region where the substrate and the light guide plate overlap, and a guide groove resides adjacent to each of the adhesive tapes.

In another aspect of the present invention, there is provided a liquid crystal display device including a substrate including a conductive pattern supplying power to a light source device. A light guide plate has a predetermined region overlapping a lower surface of the substrate. A liquid crystal display panel is disposed on the light guide plate. A plurality of adhesive tapes are located at predetermined intervals in a region where the substrate and the light guide plate overlap, and a guide groove resides adjacent to each of the adhesive tapes.

In a further another aspect of the present invention, there is provided a method of assembling a liquid crystal display device including providing a substrate and a light guide plate. Guide grooves are formed in one of the substrate or the light guide plate in a region where the light guide plate overlaps the substrate and adhesive tapes are attached at predetermined intervals in a region where the light guide plate overlap the substrate, and a liquid crystal display panel is disposed on the light guide plate.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
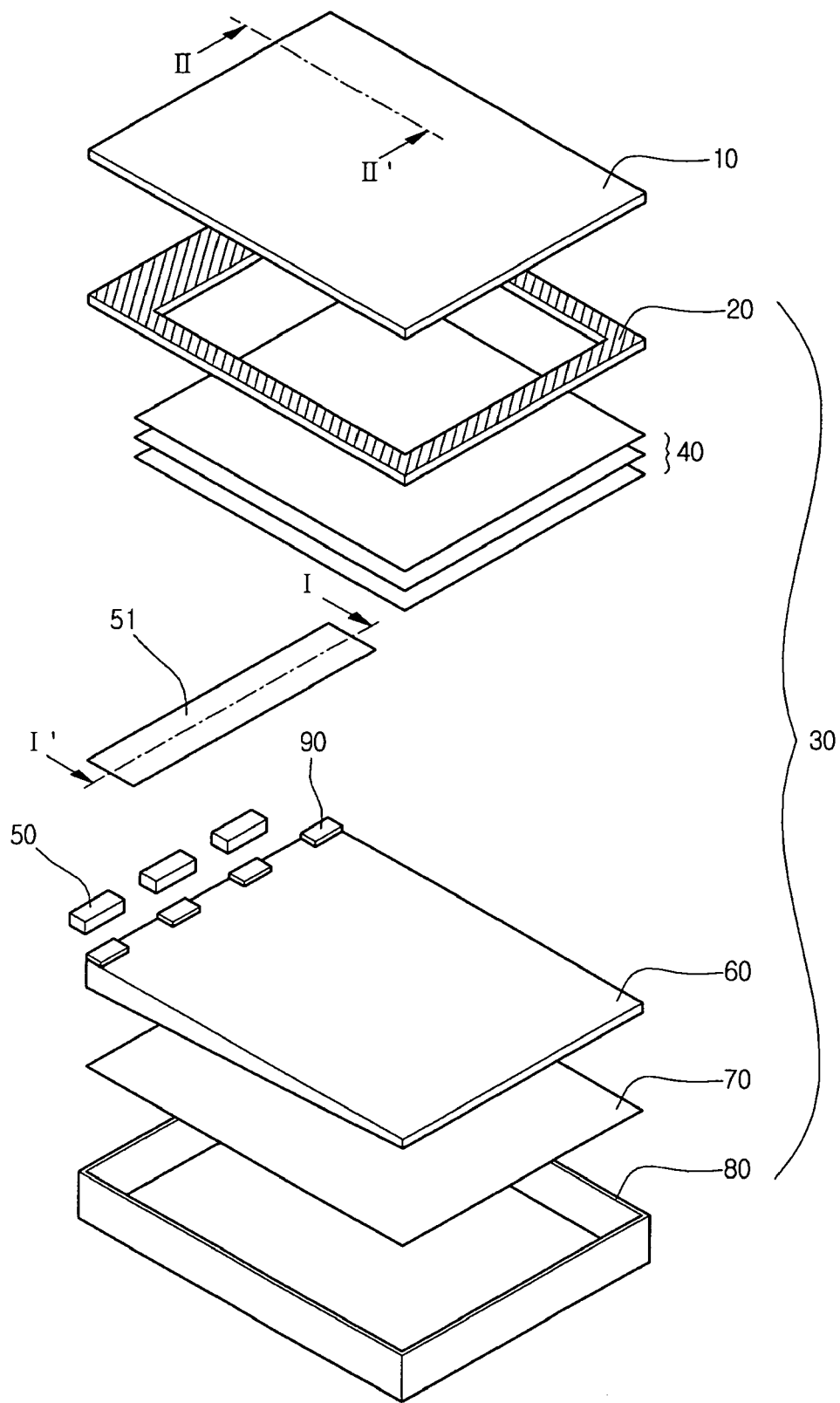
FIG. 1 is an exploded perspective view of a related art small-sized LCD.
Figure 2:
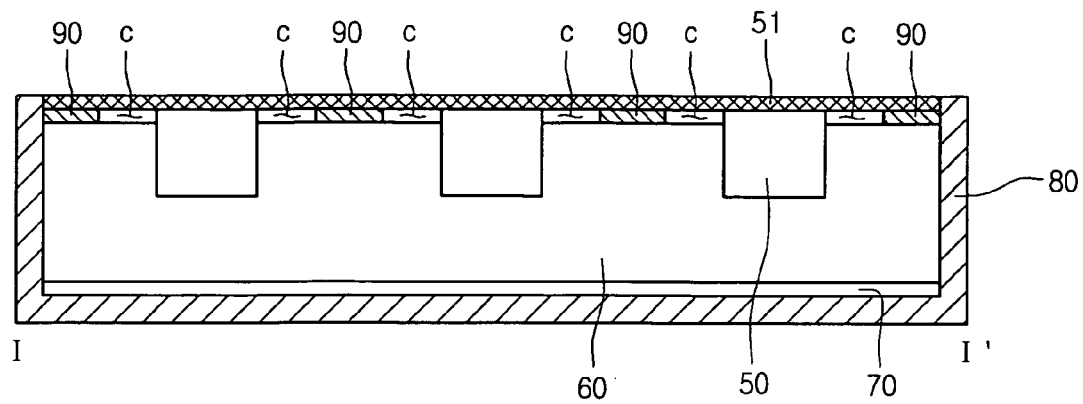
FIG. 2 is a partial cross-sectional view of the small-sized LCD taken along line I-I' of FIG. 1.
Figure 3:
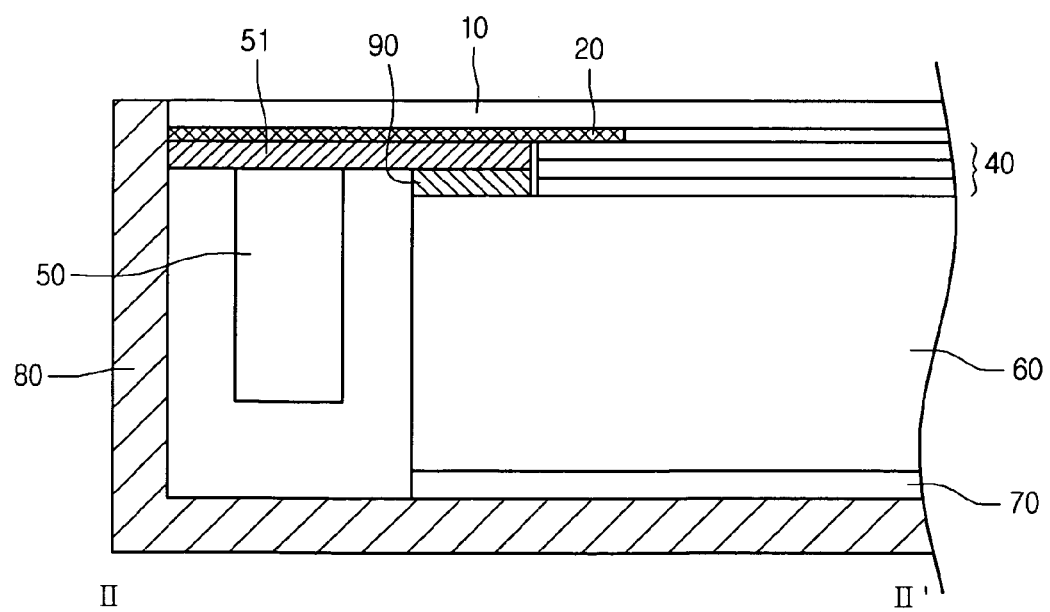
FIG. 3 is a cross-sectional view of the small-sized LCD taken along line II-II' of FIG. 3.
Figure 4:
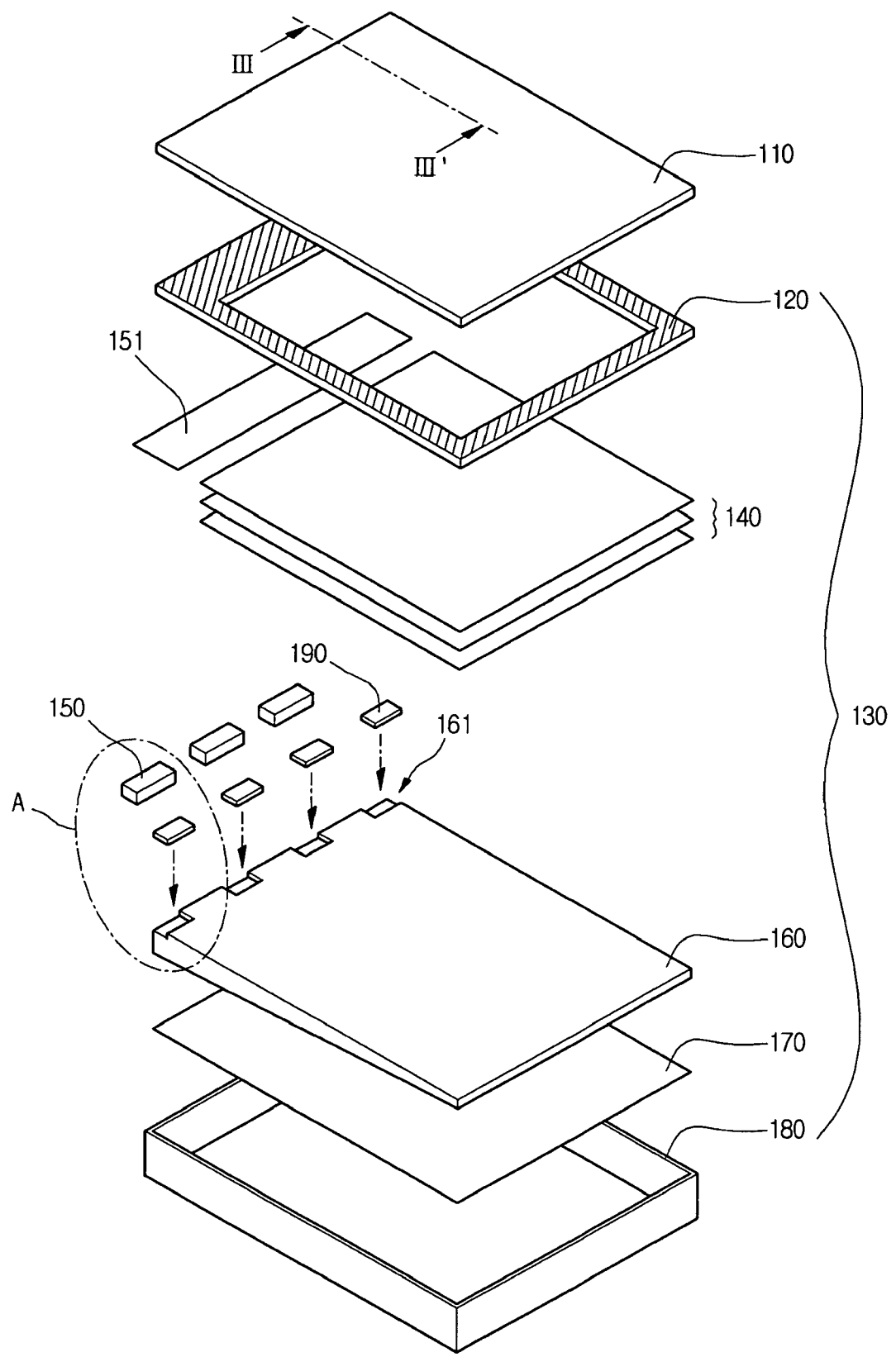
FIG. 4 is an exploded perspective view of a small-sized LCD according to one embodiment of the present invention.
Figure 5:
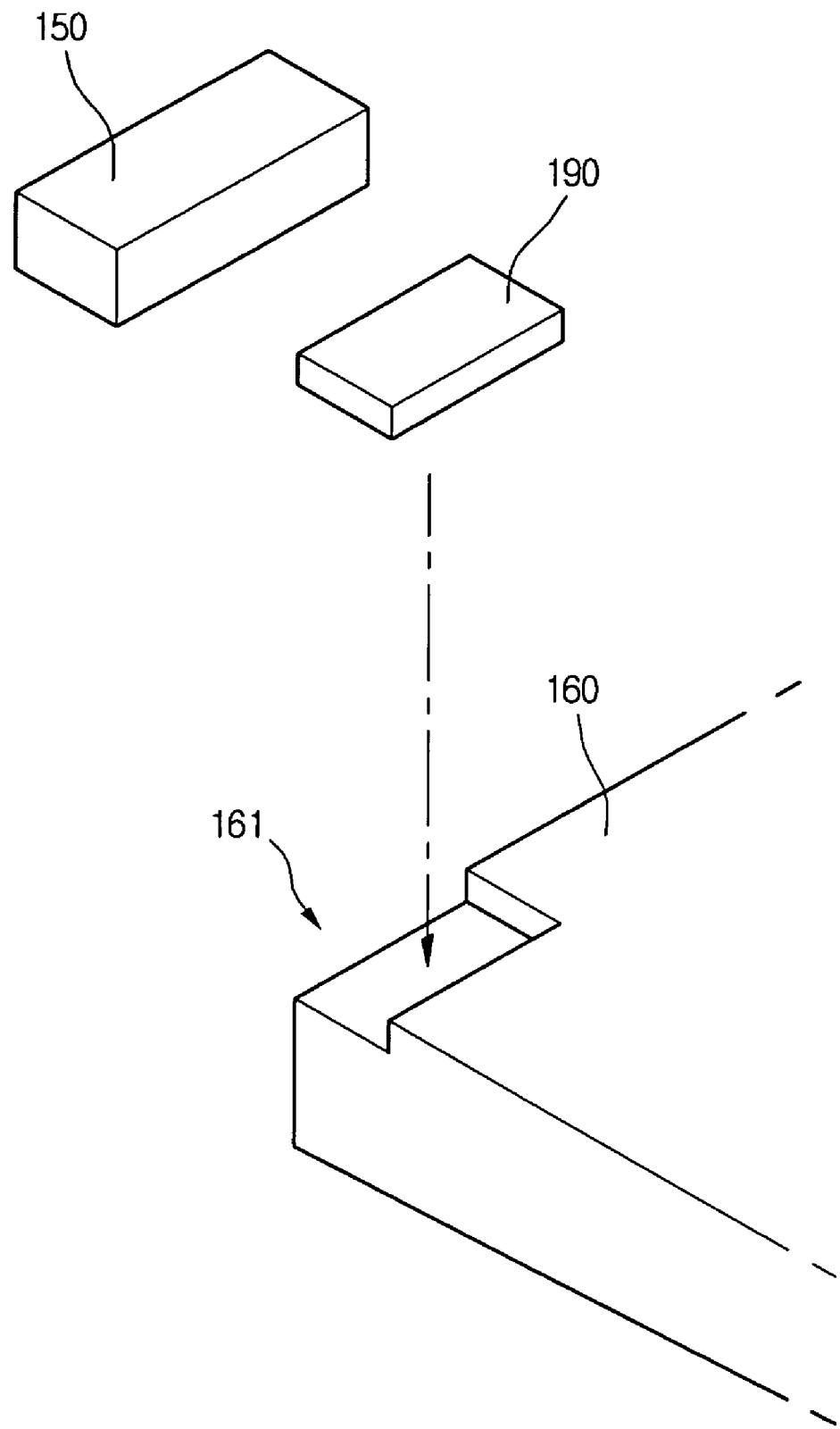
FIG. 5 is a detailed view of a light guide plate, a light emitting diode and an adhesive tape in a region A of FIG. 4.
Figure 6:
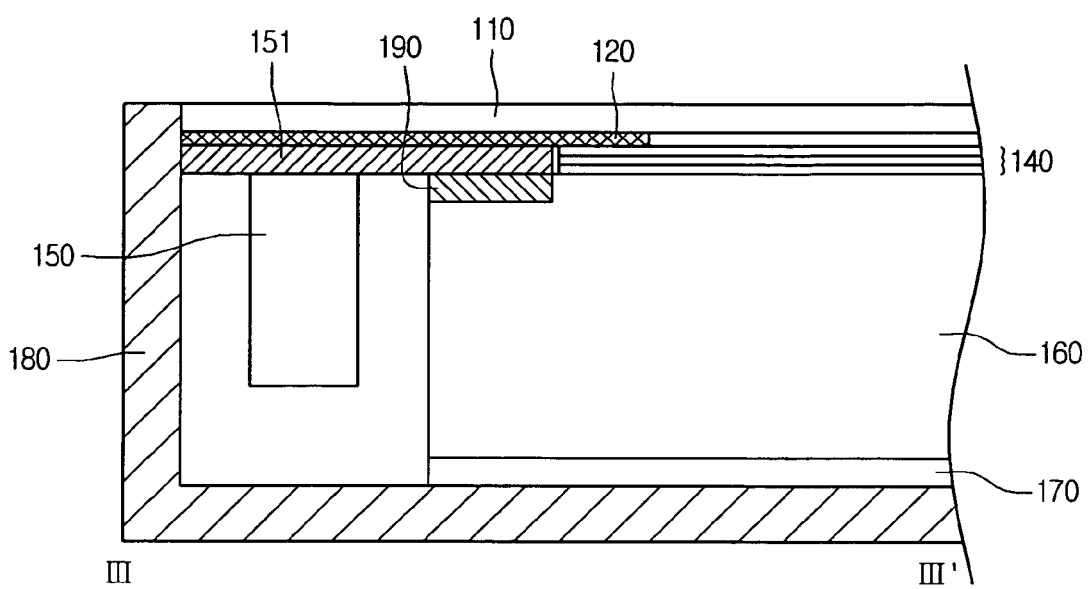
FIG. 6 is a cross-sectional view of the small-sized LCD taken along line III-III' of FIG. 4.

FIG. 4 is an exploded perspective view of a small-sized LCD according to one embodiment of the present invention, FIG. 5 is a detailed view of a light guide plate, a light emitting diode, and an adhesive tape of a region A of FIG. 4, and FIG. 6 is a cross-sectional view of a small liquid crystal display device (LCD) taken along line III-III' of FIG. 4.

Referring to FIGS. 4 through 6, the small-sized LCD according to one embodiment of the present invention includes an LCD panel 110 displaying an image, a backlight assembly 130 providing light to the LCD panel 110, and a light blocking tape 120 fixing the LCD panel 110 and the backlight assembly 130 together.

The LCD panel 110 includes a thin film transistor array substrate and a color filter substrate facing and attached to each other, with a uniform cell gap therebetween, and a liquid crystal layer interposed between the thin film transistor array substrate and the color filter substrate.

The light blocking tape 120 is a both-sided adhesive tape and thus serves to fix both the backlight assembly 130 and the LCD panel placed on the backlight assembly 130. Also, the entire light blocking tape 120 may be black to prevent light leakage.

The backlight assembly 130 includes a bottom cover 180 formed in a box shape with an opened upper side; a plurality of light emitting diodes 150 disposed at one side of the bottom cover 180 and emitting light; a light guide plate 160 disposed to form the same plane as those of the light emitting diodes 150, the light guide plate 160 converting point light to surface light; optical sheets 140 disposed on the light guide plate 160, for diffusing and condensing light; and a reflective sheet 170 disposed at the back of the light guide plate 160 and reflecting light.

The backlight assembly 130 further includes a flexible printed circuit (FPC) 151 disposed on the light emitting diodes 150 and supplying power, and a plurality of adhesive tapes 190 fixing the FPC 151 and the light guide plate 160 together.

The FPC 151 is a circuit board on which a complicated circuit is formed on a flexible insulating film. Here, as the flexible insulating film, a heat-resistant plastic film of a flexible material such as polyester (PET) or polyimide (PI) may be used. Since the flexibility of the FPC allows efficient use of a space and a 3D wiring, the FPC is widely used for a small-sized LCD.

One side of a lower surface of the FPC 151 and one side of an upper surface of the light guide plate 160 overlap each other. The adhesive tapes 190 are attached to a region where the overlap occurs.

The adhesive tapes 190 are attached to a location that does not affect a path of light emitted by the light emitting diodes 150, that is, to a location not corresponding to the light emitting diodes 150.

Each of the adhesive tape 190 is formed of transparent polyethylene-terephthalate (PET), and an adhesive is applied on both sides of the adhesive tape 190.

A plurality of guide grooves 161 corresponding to the thickness of the adhesive tape 290 are formed in one side of the upper surface of the light guide plate 160.

The guide groove 161 is formed in the same shape as that of the adhesive tape 190, that is, in a quadrangular column shape, and may be formed during a manufacturing process of the light guide plate 160.

A lower surface of each of the adhesive tapes 190 is attached on each of the guide grooves 161 of the light guide plate 160, and one side of a lower surface of the FPC 151 on which the light emitting diodes 150 are mounted is attached to an upper surface of the adhesive tape 190. Accordingly, surface contact is made between a portion of the upper surface of the light guide plate 160 and a portion of the lower surface of the FCP 15 where the adhesive tape 190 is not attached, so that no clearance is generated.

In the small-sized LCD according to one embodiment of the present invention, the guide groove 161 corresponding to the thickness of the adhesive tape 190 is formed in one side of the upper surface of the light guide plate 160 where the adhesive tape 190 is attached. Accordingly, a clearance between the overlapping portions of the FPC 151 and the light guide plate 160 is prevented from occurring, so that light leakage can be prevented. Thus, the LCD according to the present invention may implement uniform brightness.

Figure 7:
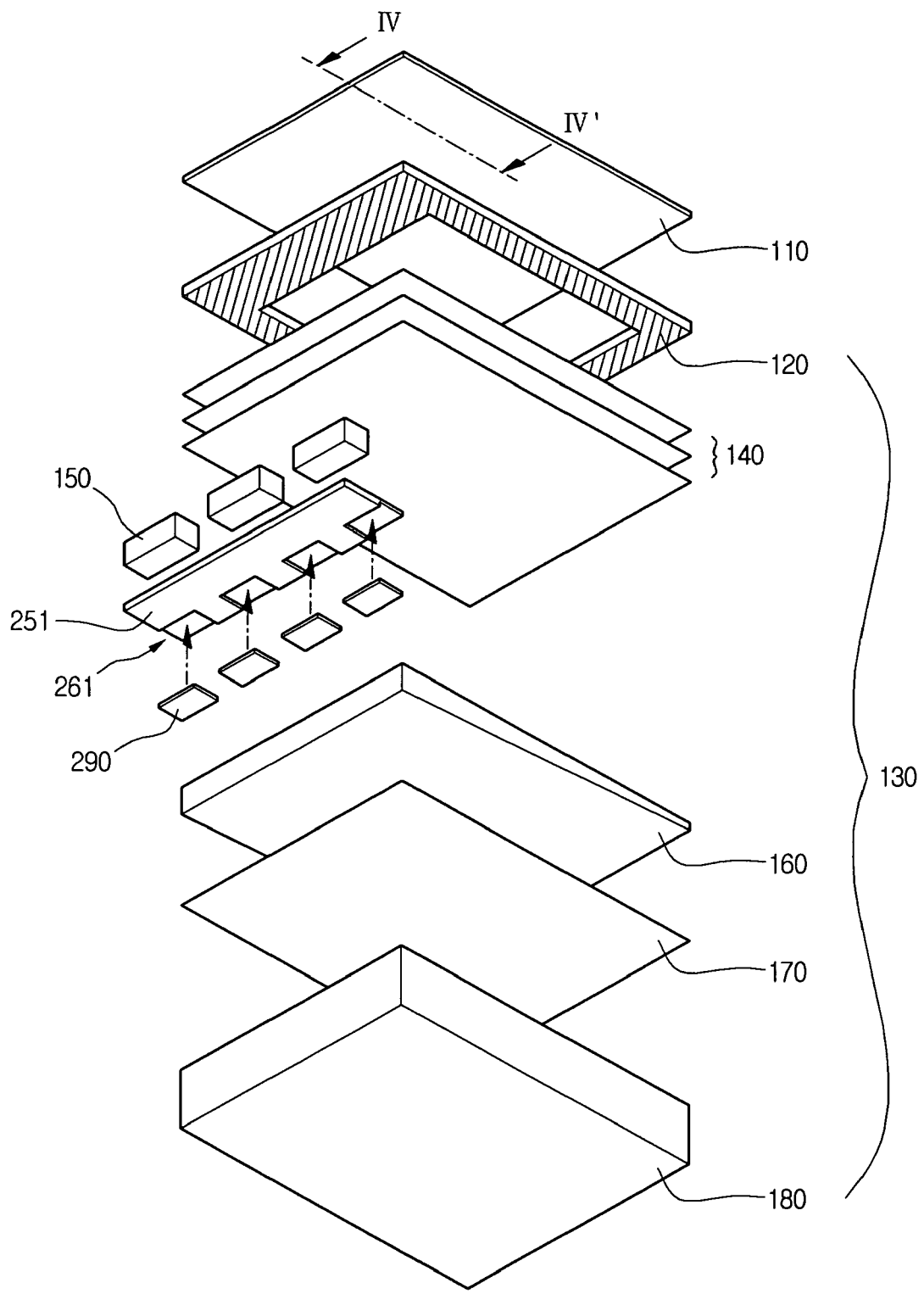
FIG. 7 is an exploded perspective view of a small-sized LCD according to another embodiment of the present invention.
Figure 8:
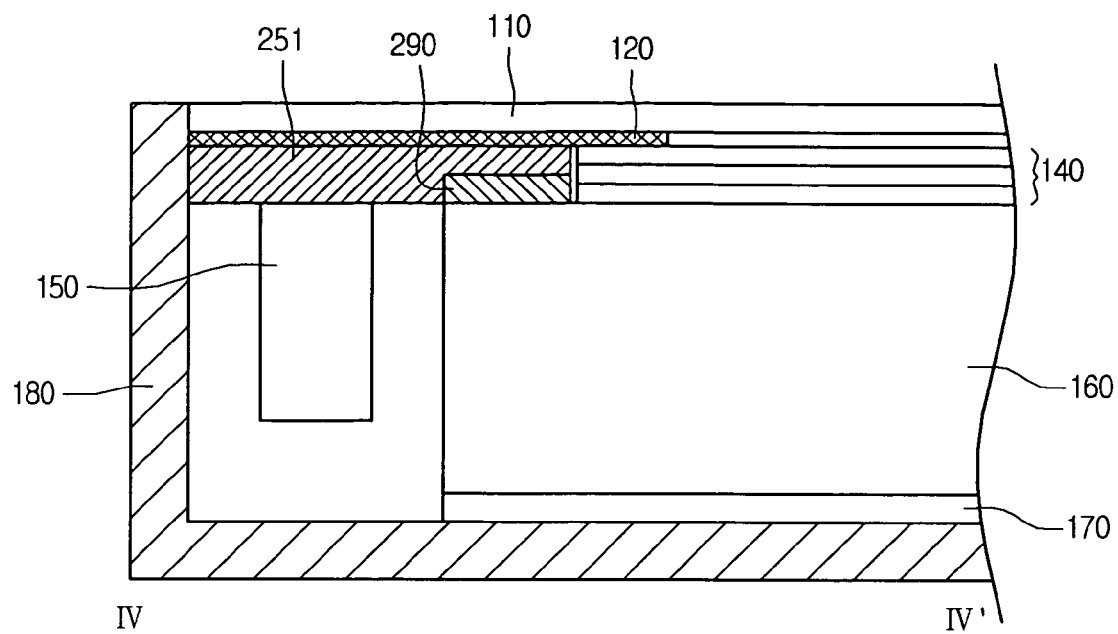
FIG. 8 is a cross-sectional view of the small-sized LCD taken along line IV-IV' of FIG. 7.

FIG. 7 is an exploded perspective view of a small-sized LCD according to another embodiment of the present invention, and FIG. 8 is a cross-sectional view of the small-sized LCD taken along line IV-IV' of FIG. 7.

As illustrated in FIGS. 7 and 8, elements of the LCD according to another embodiment of the present invention are the same as those illustrated in FIG. 4 through 6 according to one embodiment of the present invention, except for an FPC 251, adhesive tapes 290, and a light guide plat 260. Therefore, the same reference numerals are used for the same elements throughout both one embodiment and another embodiment, and the detailed description of those same elements will be omitted.

A plurality of guide grooves 261 corresponding to the thickness of the adhesive tape 290 are formed in one side of a lower surface of the FPC 251 on which the adhesive tapes 290 are attached. Here, the guide groove 261 may be formed in the same shape as the adhesive tape 290, a quadrangular column shape.

An upper surface of the adhesive tape 290 is attached on the guide groove 261 of the FPC 251. One side of the lower surface of the FPC 251 where the adhesive tape 290 is attached is adhered to one side of the upper surface of the light guide plate 260, thereby fixing the light guide plate 260. Accordingly, since each of the adhesive tapes 290 is attached in the guide groove 261 of the FPC 251, a clearance between the light guide plate 260 and the FPC 251 does not occur in a region where the light guide plate 260 and the FPC 251 overlap each other.

In the small-sized LCD according to another embodiment of the present invention, the guide grooves 261 corresponding to the thickness of the adhesive tapes 290 are formed in one side of the lower surface of the FPC 251 to which the adhesive tapes 290 are attached. Thus, a clearance is prevented from occurring in a region where the FPC 251 and the light guide plate 260 overlap each other, so that light leakage can be prevented. Accordingly, the LCD device according to the present invention may implement uniform brightness.

Figure 9A:
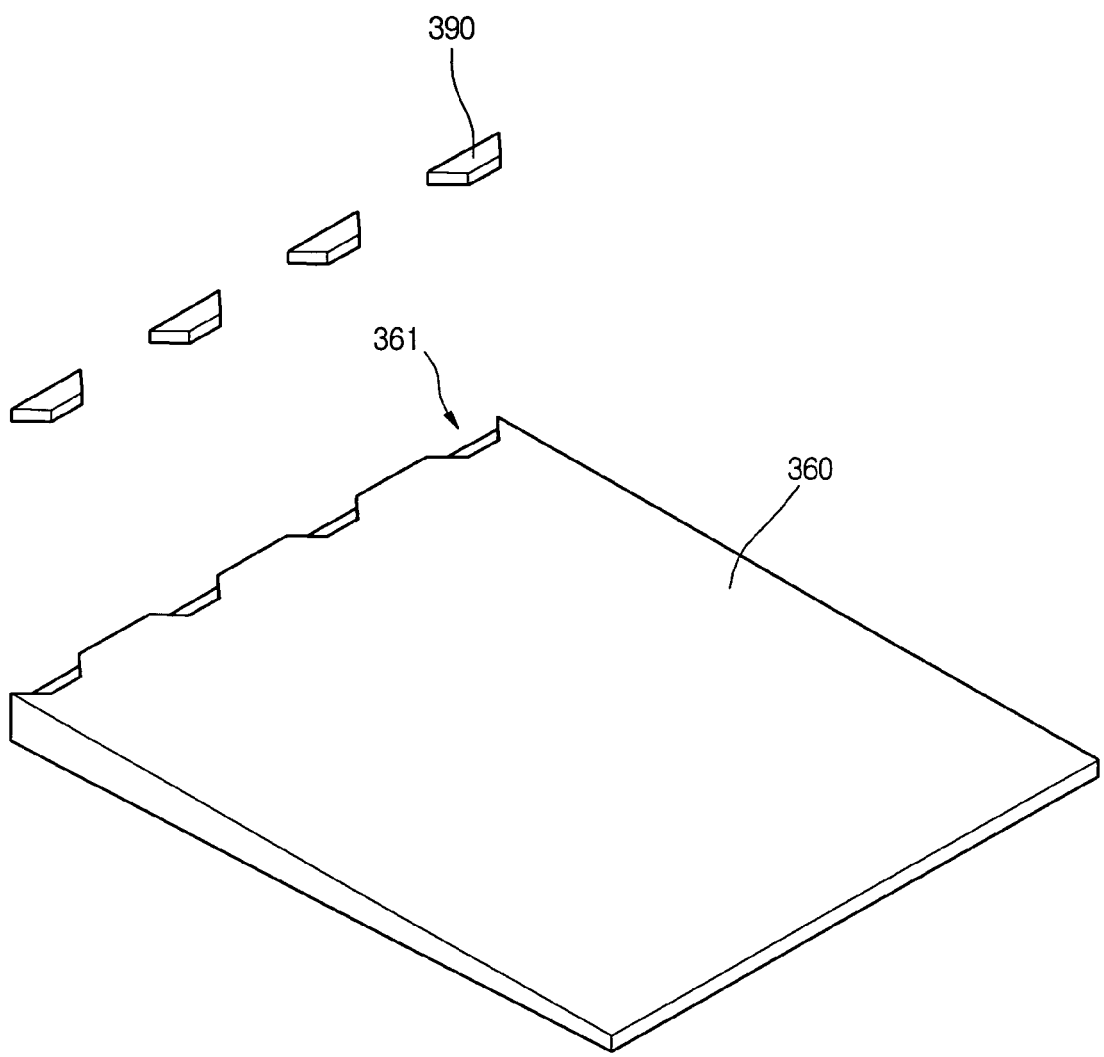
FIGS. 9a and 9b are perspective views of a light guide plate and an adhesive tape of a small-sized LCD according to still another embodiment of the present invention.
Figure 9B:
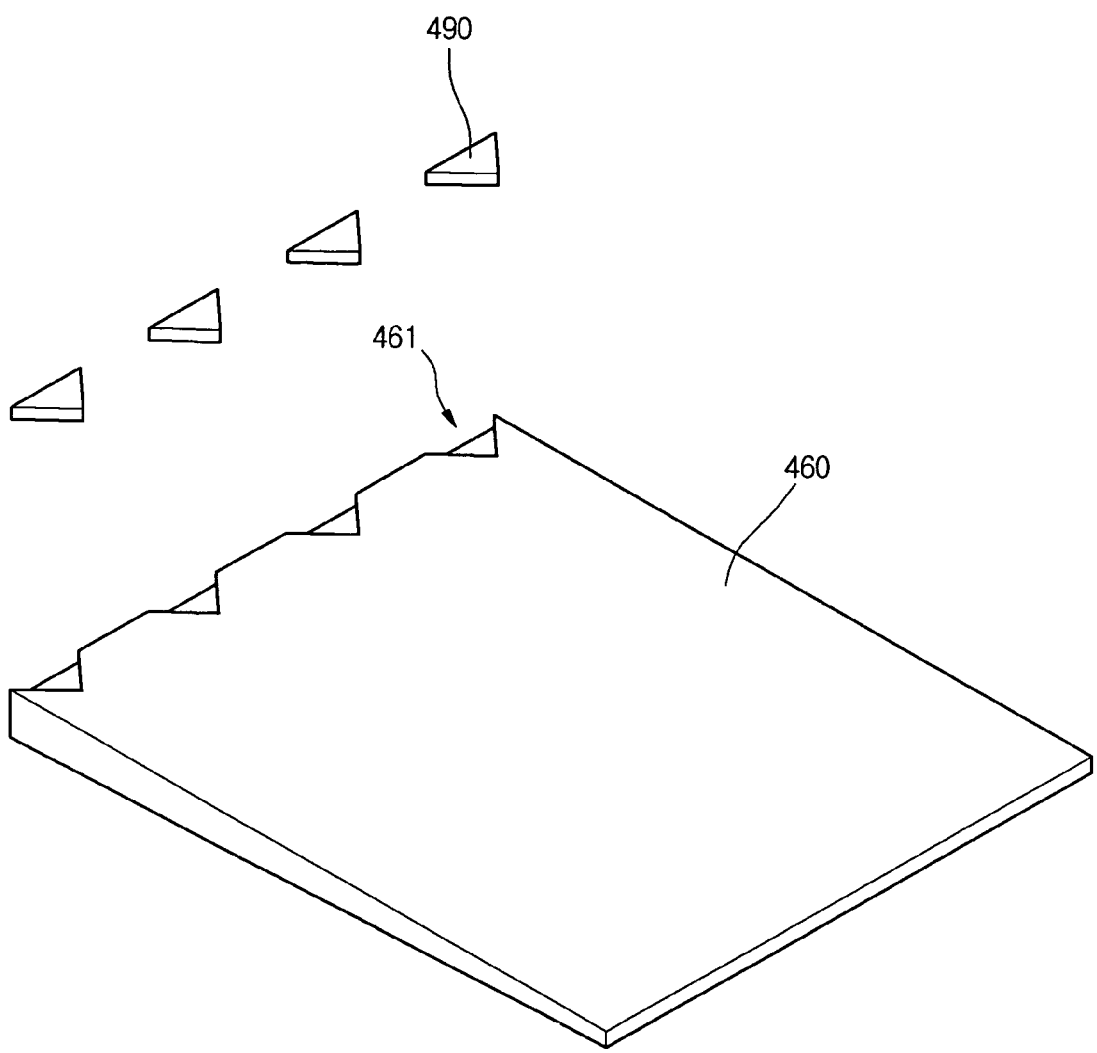

FIGS. 9a and 9b are perspective views of a light guide plate and adhesive tapes of a small-sized LCD according to still another embodiment of the present invention.

As illustrated in FIGS. 9a and 9b, the small-sized LCD according to still another embodiment of the present invention includes a light guide plate 360 (460) has guide grooves 361 (461) for adhesive tapes 390 (490) at one side of an upper surface thereof.

The guide groove 361 (461) may have the same shape and correspond to the thickness of the adhesive tape 390 (490).

The guide groove 361 (461) may be formed during a manufacturing process of the light guide plate 360 (460). The guide groove 361 (461) is formed to prevent a clearance from occurring in a region where the light guide plate 360 (460) overlaps an FPC not shown (151 of FIG. 4).

Referring to the detailed description of the LCD according to one embodiment of the present invention, the guide groove 361 (461) may be formed in any shape including a trapezoid shape, a triangular shape or a round shape depending on the shape and thickness of the adhesive tape 390 (490).

Although formed in one side of the upper surface of the light guide plate 360 (460) in the current embodiment, the guide groove 361 (461) may be formed in one side of a lower surface of an FPC (251 of FIG. 7), similarly to the LCD according to another embodiment of FIGS. 7 and 8, and have various shapes including a trapezoid shape, a triangular shape and a round shape according to the shape of the adhesive tape 390, 490. Accordingly, any technique within the scope of the technical aspect of the present invention may be considered as the spirit of the present invention.

As described so far, in the present invention, a guide groove corresponding to the thickness of an adhesive tape and having the same shape as the adhesive tape is formed in one side of an upper surface of a light guide plate, so that a clearance is prevented from occurring between an FPC and the light guide plate. Accordingly, defections of light leakage can be prevented.

Also, in the present invention, since a guide groove corresponding to the thickness of the adhesive tape and having the same shape as that of the adhesive tape is formed in one side of a lower surface of the FPC, so that a clearance between the FPC and the light guide plate is prevented. Accordingly, defections of the light leakage can be prevented.

Furthermore, in the present invention, a guide groove on which an adhesive tape is attached is formed in the FPC or the light guide plate, so that a clearance is prevented from occurring between the FPC and the light guide plate. Accordingly, an LCD having uniform brightness can be implemented.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A backlight assembly comprising:
    a flexible printed circuit having a conductive pattern supplying power to a light source device;
    a light guide plate disposed at a side portion of the light source device and in the same plane as the light source device;
    a plurality of guide grooves formed in side portion of an upper surface of the light guide plate; and
    a plurality of adhesive tapes, each being attached to and within each guide groove and being attached to the flexible printed circuit.

2. The backlight assembly according to claim 1, wherein the guide groove substantially corresponds to the thickness of the adhesive tapes and has substantially the same shape as the adhesive tapes.

3. The backlight assembly according to claim 1, wherein the guide groove and the adhesive tapes comprise one of an angular geometry or a round geometry.

4. The backlight assembly according to claim 1, wherein the guide groove comprises a plurality of integral structures of the light guide plate.

5. A backlight assembly comprising:
    a flexible printed circuit having a conductive pattern supplying power to a light source device;
    a light guide plate disposed at a side portion of the light source device and in the same plane as the light source device;
    a plurality of guide grooves formed in side portion of a lower surface of the flexible printed circuit; and
    a plurality of adhesive tapes, each being attached to and within each guide groove and being attached to the light guide plate.

6. The backlight assembly according to claim 5, wherein the guide groove substantially corresponds to the thickness of the adhesive tape and has substantially the same shape as the adhesive tapes.

7. The backlight assembly according to claim 5, wherein the guide groove and the adhesive tapes comprise one of an angular geometry or a round geometry.

8. A liquid crystal display device comprising:
    a flexible printed circuit including a conductive pattern supplying power to a light source device;
    a light guide plate disposed at a side portion of the light source device and having a predetermined region overlapping a lower surface of the flexible printed circuit;
    a liquid crystal display panel disposed on the light guide plate;
    a plurality of guide grooves formed in side portion of an upper surface of the light guide plate; and
    a plurality of adhesive tapes, each being attached to and within each guide groove and being attached to the flexible printed circuit.

9. The device according to claim 8, wherein the guide groove substantially corresponds to the thickness of the adhesive tapes and has substantially the same shape as the adhesive tape.

10. The device according to claim 8, wherein the guide groove and the adhesive tapes comprise one of an angular geometry or a round geometry.

11. The device according to claim 8, wherein the guide groove comprises a plurality of integral structures of the light guide plate.

12. A liquid crystal display device comprising:
- a flexible printed circuit including a conductive pattern supplying power to a light source device;
- a light guide plate disposed at a side portion of the light source device and having a predetermined region overlapping a lower surface of the flexible printed circuit;
- a liguid crystal display panel disposed on the light guide plate;
- a plurality of guide grooves formed in side portion of a lower surface of the flexible printed circuit; and
- a plurality of adhesive tapes, each being attached to and within each guide groove and being attached to the light guide plate.

13. The device according to claim 12, wherein the guide groove substantially corresponds to the thickness of the adhesive tape and has substantially the same geometry as the adhesive tapes.

14. The device according to claim 12, wherein the guide groove and the adhesive tapes comprise one of an angular geometry or a round geometry.

15. A method of assembling a liquid crystal display device, the method comprising:

providing a flexible printed circuit including a light source device;

providing a light guide plate disposed at a side portion of the light source device;

forming a plurality of guide grooves in side portion of one a lower surface of the flexible printed circuit and an upper surface of the light guide;

attaching a plurality of adhesive tapes in the guide grooves and the other of the flexible printed circuit and the light guide plate; and disposing a liquid crystal display panel on the light guide plate.

16. The method according to claim 15, wherein forming guide grooves comprises forming grooves in the light guide plate.

17. The method according to claim 15, wherein forming guide groove comprises forming grooves at substantially the same time as providing the light guide plate.

18. The method according to claim 15, wherein forming guide grooves comprises forming guide grooves to substantially the same depth as the thickness of the adhesive tapes and having substantially the same shape as the adhesive tapes.

19. The method according to claim 15, wherein forming guide grooves comprises forming grooves in the flexible printed circuit.

* * * * *

UNITED STATES PATENT AND TRADEMARK OFFICE
CERTIFICATE OF CORRECTION

PATENT NO. : 7,548,287 B2  Page 1 of 1
APPLICATION NO. : 11/635352
DATED : June 16, 2009
INVENTOR(S) : Ji Soon Oh It is certified that error appears in the above-identified patent and that said Letters Patent is hereby corrected as shown below:

On the Title Page

Item (57), line 1, under "ABSTRACT", before "backlight assembly" delete "An" and substitute --A-- in its place.

In the Claims

In column 6, claim 6, line 45, before "and has substantially" delete "tape" and substitute --tapes-- in its place.

In column 6, claim 9, line 66, delete "tape." and substitute --tapes.-- in its place.

In column 7, claim 13, line 22, before "and has substantially" delete "tape" and substitute --tapes-- in its place.

In column 8, claim 15, line 5, after "side portion of one" insert --of--.

In column 8, claim 17, line 17, before "comprises forming grooves" delete "groove" and substitute --grooves-- in its place.

Signed and Sealed this

Twenty-second Day of September, 2009

David J. Kappos
*Director of the United States Patent and Trademark Office*